United States Patent
Searcy

(10) Patent No.: US 10,637,582 B1
(45) Date of Patent: Apr. 28, 2020

(54) OPTICAL LASER COMMUNICATION APPARATUS WITH ETALON-BASED OPTICAL PHASE DEMODULATION AND ASSOCIATED METHODS

(71) Applicant: BridgeSat, Inc., Denver, CO (US)

(72) Inventor: Paul Searcy, Niwot, CO (US)

(73) Assignee: BridgeSat, Inc., Denver, CO (US)

( * ) Notice: Subject to any disclaimer, the term of this patent is extended or adjusted under 35 U.S.C. 154(b) by 0 days.

(21) Appl. No.: 16/408,162

(22) Filed: May 9, 2019

Related U.S. Application Data

(60) Provisional application No. 62/671,415, filed on May 14, 2018.

(51) Int. Cl.
| | |
|---|---|
| *H04B 10/00* | (2013.01) |
| *H04B 10/67* | (2013.01) |
| *H04B 10/40* | (2013.01) |
| *H04B 10/25* | (2013.01) |
| *H04J 14/00* | (2006.01) |

(52) U.S. Cl.
CPC .......... *H04B 10/676* (2013.01); *H04B 10/25* (2013.01); *H04B 10/40* (2013.01)

(58) Field of Classification Search
CPC ... H04B 10/11; H04B 10/112; H04B 10/1121; H04B 10/1123; H04B 10/1125; H04B 10/118; H04B 10/60; H04B 10/67; H04B 10/676; H04B 10/677
See application file for complete search history.

(56) References Cited

U.S. PATENT DOCUMENTS

| | | | |
|---|---|---|---|
| 5,710,655 A | * | 1/1998 | Rumbaugh ............... G02F 1/21 359/249 |
| 2018/0367223 A1 | * | 12/2018 | Graceffo ................ H04B 10/85 |

* cited by examiner

*Primary Examiner* — Daniel G Dobson
(74) *Attorney, Agent, or Firm* — Patents Integrated

(57) ABSTRACT

An optical receiver for use in free space communication from a transmitter to the optical receiver is configured for receiving optical signals from the transmitter. The optical receiver includes optics for collecting the optical signals, a demodulator for converting the optical signals so collected into a data stream, a signal processing unit for processing the data stream into an analog signal, and an analog-to-digital converter for converting the analog signal into a digital output. The demodulator includes a plurality of apertures, each one of the plurality of apertures being optically connected with an etalon of an optical path length that is different from the optical path length of another etalon optically connected with another one of the plurality of apertures.

11 Claims, 7 Drawing Sheets

OPTICAL LASER COMMUNICATION APPARATUS WITH ETALON-BASED OPTICAL PHASE DEMODULATION AND ASSOCIATED METHODS

FIELD OF THE INVENTION

The present invention relates to laser communications and, more particularly, to laser communication transceivers capable of coupling light from a window into a receiver arrangement.

BACKGROUND OF THE INVENTION

Current communication systems rely on the use of radio frequencies (RF) for the data downlink from low Earth orbit (LEO) small satellite (SmallSat) or from Geosynchronous satellites (GEO). An illustration of a variety of currently available communication configurations is shown in FIG. 1. As shown in FIG. 1, communication channels between different geostationary earth orbit (GEO) satellites, between a GEO satellite and lower earth orbit (LEO) satellites, between a GEO satellite and a ground station, mobile user on an aircraft or submarine, or an unmanned autonomous vehicle (UAV) are currently possible. However, there are limitations to the data rates and data capacity of RF Small-Sats due to the frequency range and mechanical limitations of the current systems.

For example, the transceivers and ground stations of current systems require gimbals and other large mechanical means for physically scanning the field of view of the devices through a range of angles in order to be able to capture signal over those angles. This requirement is due to the fact that the currently available transceivers include a single aperture telescope for capturing and transmitting data signals therebetween. Such mechanical implementations are impractical or even detrimental for physical space and weight constrained applications such as on airplanes and UAVs.

SUMMARY OF THE INVENTION

In accordance with the embodiments described herein, an optical receiver for use in free space communication from a transmitter to the optical receiver is configured for receiving optical signals from the transmitter. The optical receiver includes optics for collecting the optical signals, a demodulator for converting the optical signals so collected into a data stream, a signal processing unit for processing the data stream into an analog signal, and an analog-to-digital converter for converting the analog signal into a digital output. The demodulator includes a plurality of apertures, each one of the plurality of apertures being optically connected with an etalon of an optical path length that is different from the optical path length of another etalon optically connected with another one of the plurality of apertures.

In another embodiment, the optical receiver includes at least three apertures.

In yet another embodiment, at least one of the etalons is formed of a uniaxial or biaxial material, and the demodulator accepts input signal over a larger range of incident angles than would be accepted by another demodulator in which all of the etalons are formed of isotropic materials.

In still another embodiment, a receiver system for use in free space communication from a plurality of transmitters to the receiver system is disclosed. The receiver system is configured for receiving optical signals from the plurality of transmitters and includes a plurality of optical receivers. Each optical receiver includes optics for collecting at least a portion of the optical signals over a range of incident angles, a demodulator for converting the optical signals so collected into a data stream, a signal processing unit for processing the data stream into an analog signal, an analog-to-digital converter for converting the analog signal into a digital output, and a fiber bundle including a plurality of optical fibers. The demodulator includes a plurality of apertures, each one of the plurality of apertures being optically connected with an etalon of an optical path length that is different from the optical path length of another etalon optically connected with another one of the plurality of apertures. The combination of optics and demodulator is configured for directing each one of the optical signals accepted at the optics to a specific optical fiber depending on the incident angle of that optical signal. Each one of the plurality of optical receivers is configured for receiving a different portion of the optical signals from the portion received by every other one of the plurality of optical receivers.

DETAILED DESCRIPTION OF EMBODIMENTS OF THE INVENTION

Figure 1:
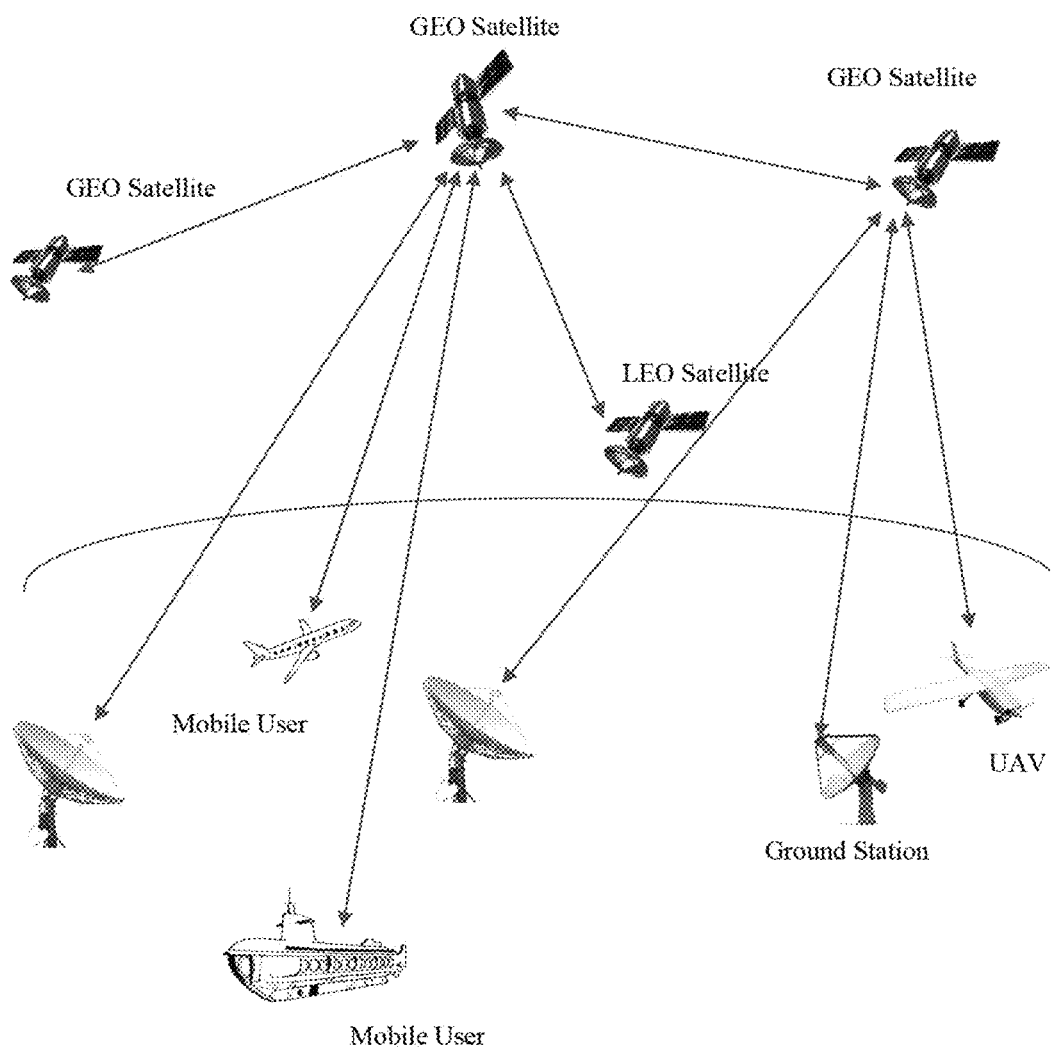
FIG. 1 illustrates a variety of communication configurations between different components that are currently available via RF communications.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Space-based optical communication systems are poised to take a breakthrough role in commercial SmallSat missions. New technology developments are enabling the migration from traditional RF designs to optical communications to provide a significant leap in the data downlink capabilities of LEO SmallSats.

A factor in the transition from RF systems to optical systems is the availability of a full turnkey solution that seamlessly connects SmallSats and high-altitude UAVs to servers on the ground, while accommodating the accelerating demand for accurate and frequent data collection from LEO SmallSats. Such an optical connectivity system will increase the speed, security, and efficiency of data transmissions from LEO SmallSats with additional capabilities beyond those provided by RF systems.

Recent innovations in optical signal transceivers, such as the incorporation of optical phased arrays, have potentially enormous benefits for integrating into existing aeronautical and space communication systems. For instance, recent improvements in optical communications include the use of phase modulation as a means of encoding data into the optical signal. One example of an optical receiver for demodulating such phase modulated optical signals is the inclusion of a Fabry-Perot etalon, which provides further improvement over other demodulation mechanisms such as local oscillators, fiber Bragg gratings, and delay line interferometers, which convert phase modulation into amplitude modulation (See, for example, U.S. Pat. App. Pub. No. 2018/0054259 A1 by Kowalevicz, et al.).

However, specifically for spaced-based optical communication systems, a greater flexibility in the range of acceptance angles for the incoming signals, as well as the ability to phase demodulate a variety of different phase modulations would be desirable.

Figure 2:
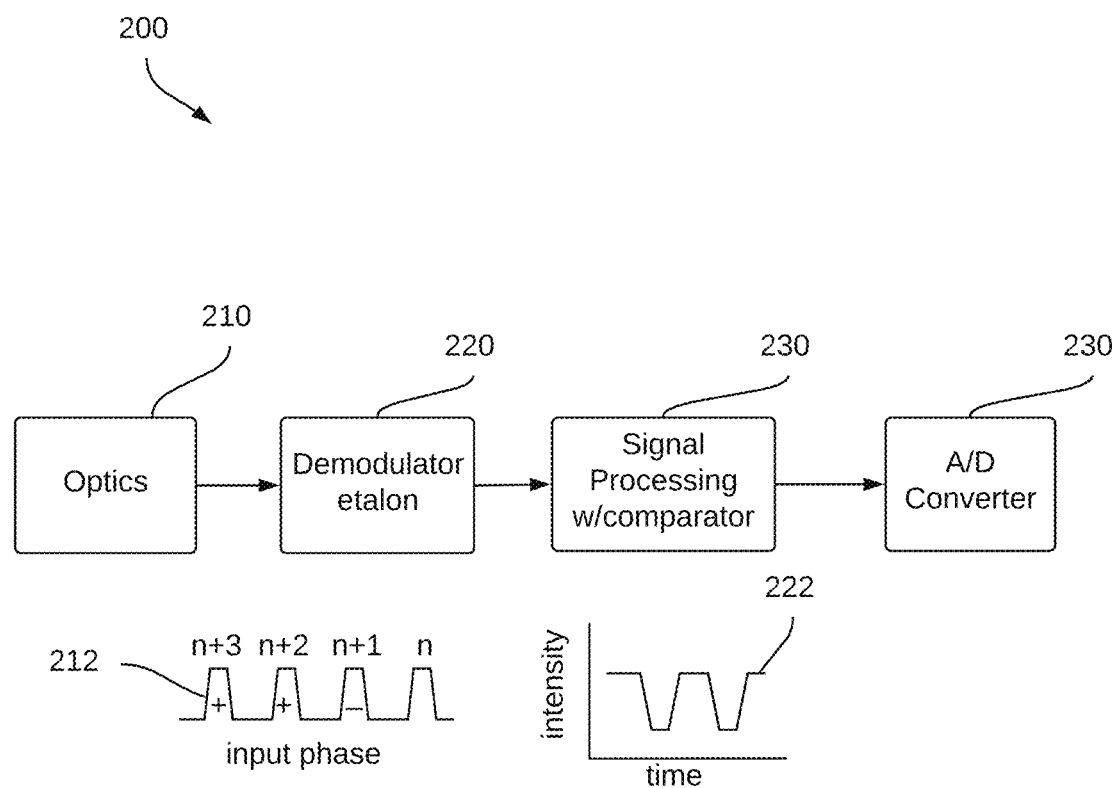
FIG. 2 shows a diagram of an optical receiver, including a demodulator etalon, in accordance with an embodiment.

Approaches to overcome such shortcomings of previous methods are disclosed herein. In an embodiment, illustrated in FIG. 2, an optical receiver 200 includes optics 210 for receiving an optical signal from an external source, such as a satellite, a ground station, mobile user, an aircraft, a submarine, or UAV. When received at optics 210, a received signal 212 includes a series of phase modulations, represented by n, n+1, etc. Optics 210 directs received signal 212 into a demodulator etalon 220, which demodulates received signal 212 and directs a demodulated signal 222 into a signal processing unit 230, which includes a comparator. Once demodulated signal has been processed, signal processing unit 230 directs a processed signal into an analog-to-digital (A/D) converter 240, which converts the processed signal into a digital data stream.

Figure 3:
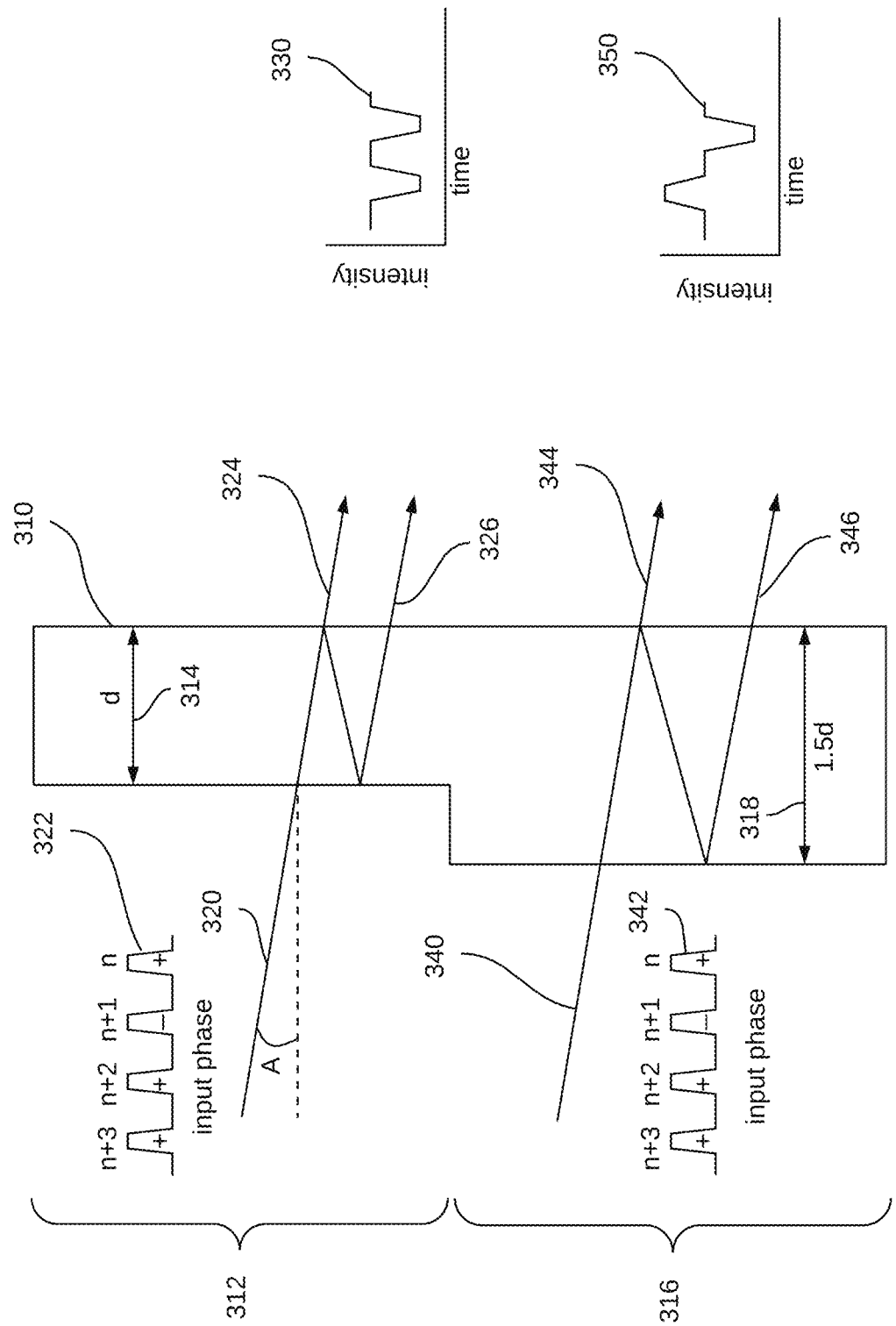
FIG. 3 shows further details of a demodulator etalon for use with the optical receiver, in accordance with an embodiment.

While a simple Fabry-Perot etalon (such as disclosed in Kowalevicz et al.) can be used as demodulator etalon 220, improvements are disclosed herein for further improving the signal demodulation properties of the demodulator etalon. An exemplary embodiment is illustrated in FIG. 3, which shows a demodulator etalon 310. Demodulator etalon 310 includes an upper section 312 with a thickness d (indicated by a double-headed arrow 314), and a lower section 316 with a thickness 1.5 d (indicated by a double-headed arrow 318). For example, a first optical signal 322 with input phases as shown (peaks n, n+2, and n+3 with+phase, and peak n+1 with-phase), is incident on upper section 312 at an incident angle A. In this case, the adjacent pulses (namely n and n+1, as well as n+2 and n+3) interfere with each other in output beams 324 and 326 so as to produce a first demodulated output 330. When a second optical signal 340, also with a similar input phase profile as first optical signal 320, is incident on lower section 316 of demodulator etalon 310, the larger thickness leads to non-adjacent pulses interfering for output beams 344 and 346, thus leading to a second demodulated output 350. It is noted that FIG. 3 is not drawn to scale.

Figure 4:
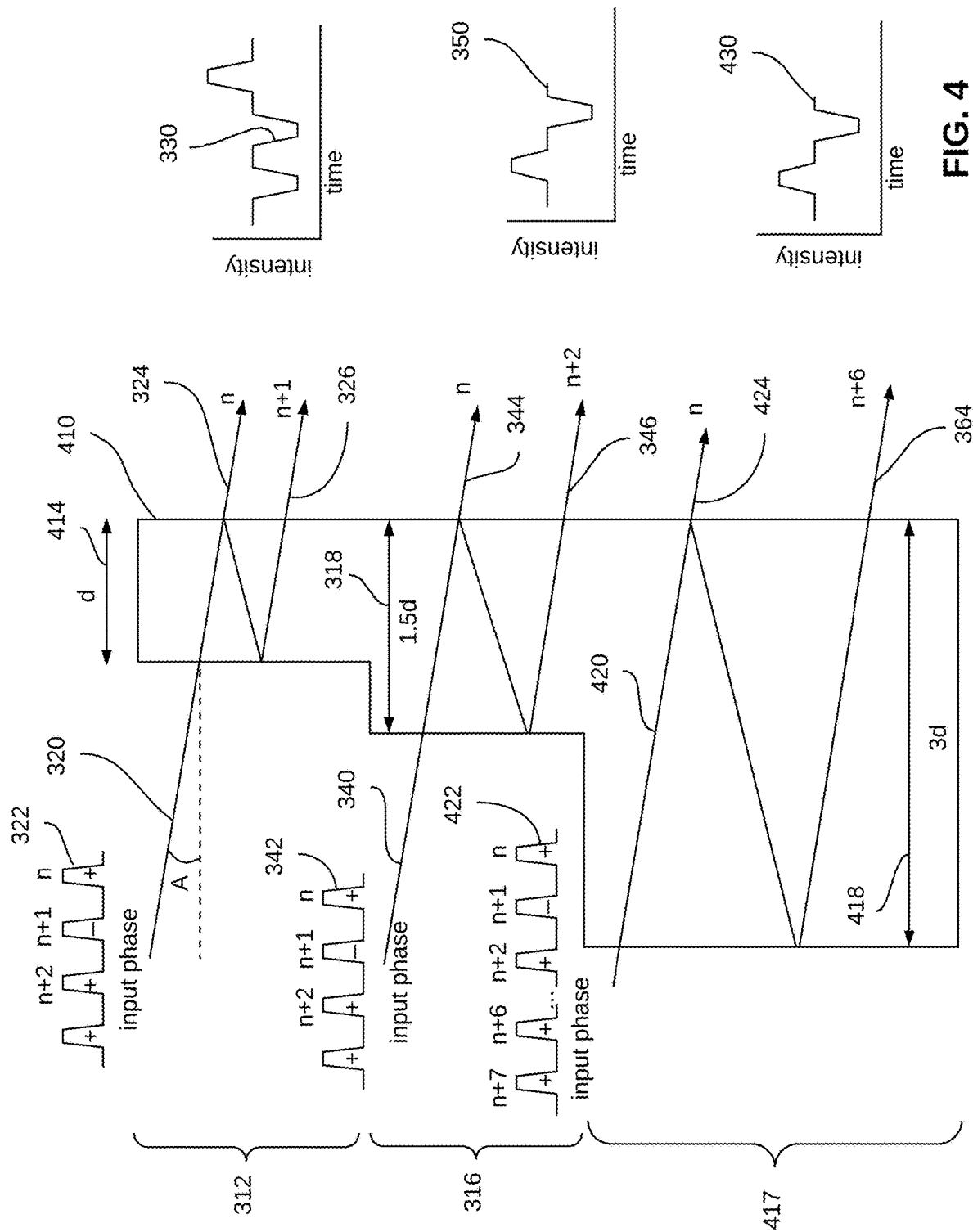
FIG. 4 shows further details of an alternative demodulator etalon for use with the optical receiver, in accordance with an embodiment.

The concept illustrated in FIG. 3 can be extended to additional thicknesses, such as in an exemplary embodiment shown in FIG. 4. In addition to upper section 312 and lower section 316 of demodulator etalon 310, a demodulator etalon 410 further includes a third section 417, with a thickness 3 d. When a third optical signal 420, with an input phase profile 422, is incident on third section 417, output beams 364 and 366 are such that n and n+6 phase pulses are interfered for output beams 424 and 426, thus resulting in a third demodulated output 430.

The embodiments illustrated in FIGS. 3 and 4 are dependent on the thickness differences in different sections of demodulator etalons 310 and 410, respectively, resulting in differences in optical path lengths traveled by optical signals incident thereon. Thus, by modifying the thicknesses (and thus the effective optical path lengths) in different sections of the demodulator etalon, different portions of the input pulses can be interfered. This technique enables encoding of different layers of data in the same set of input pulses, resulting in different information extracted by interfering adjacent pulses, non-adjacent pulses, etc. Furthermore, the effective optical path lengths through different sections of the demodulator etalons can be tuned in real time if, for instance, one or more sections of the demodulator etalon is formed of a liquid crystal layer or another electro-optic material for tunability. Such tunable devices can also be used to compensate for demodulator etalon thickness changes when exposed to variable temperatures.

Figure 5:
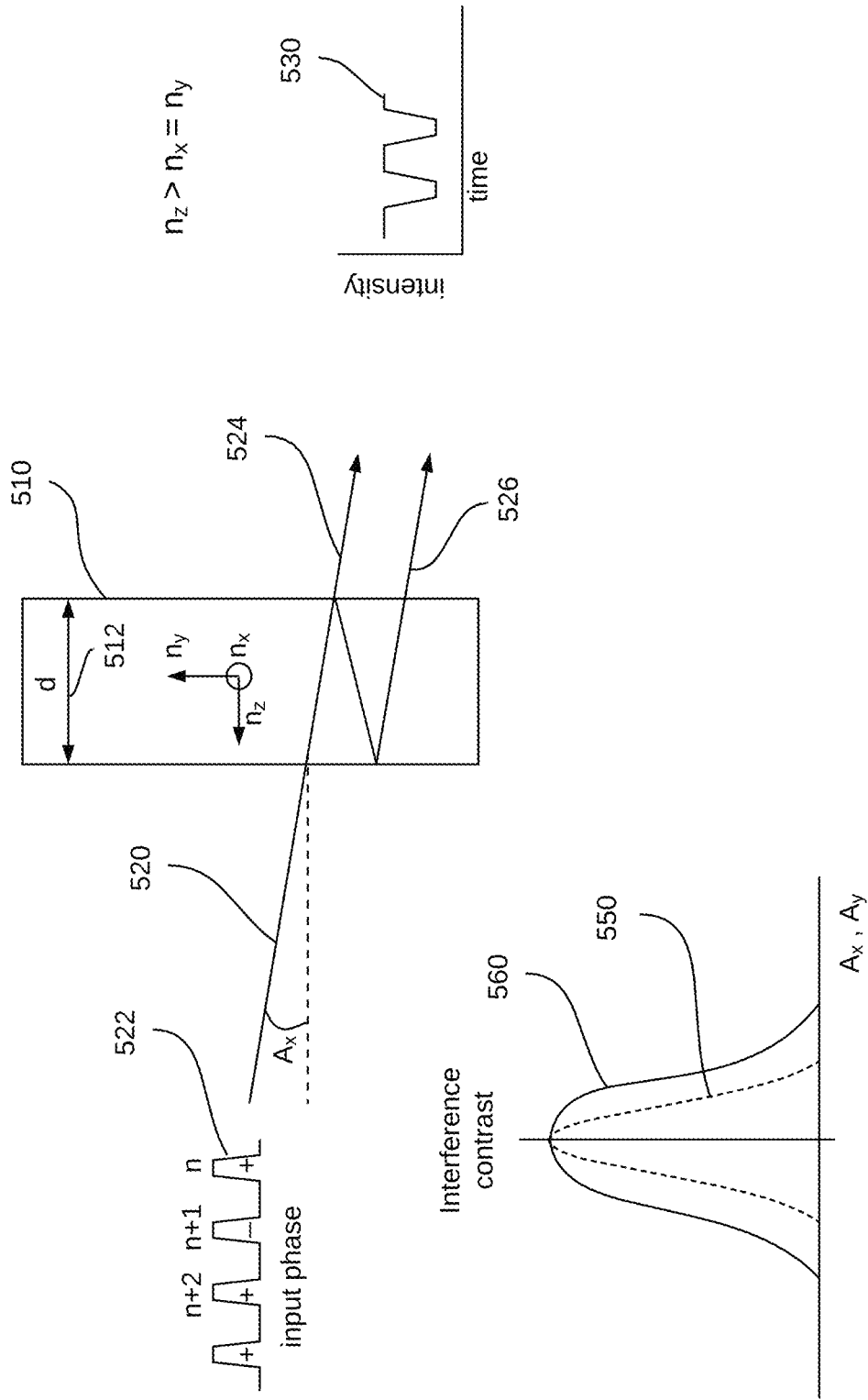
FIG. 5 shows another alternative demodulator etalon for use with the optical receiver, in accordance with an embodiment.
Figure 6:
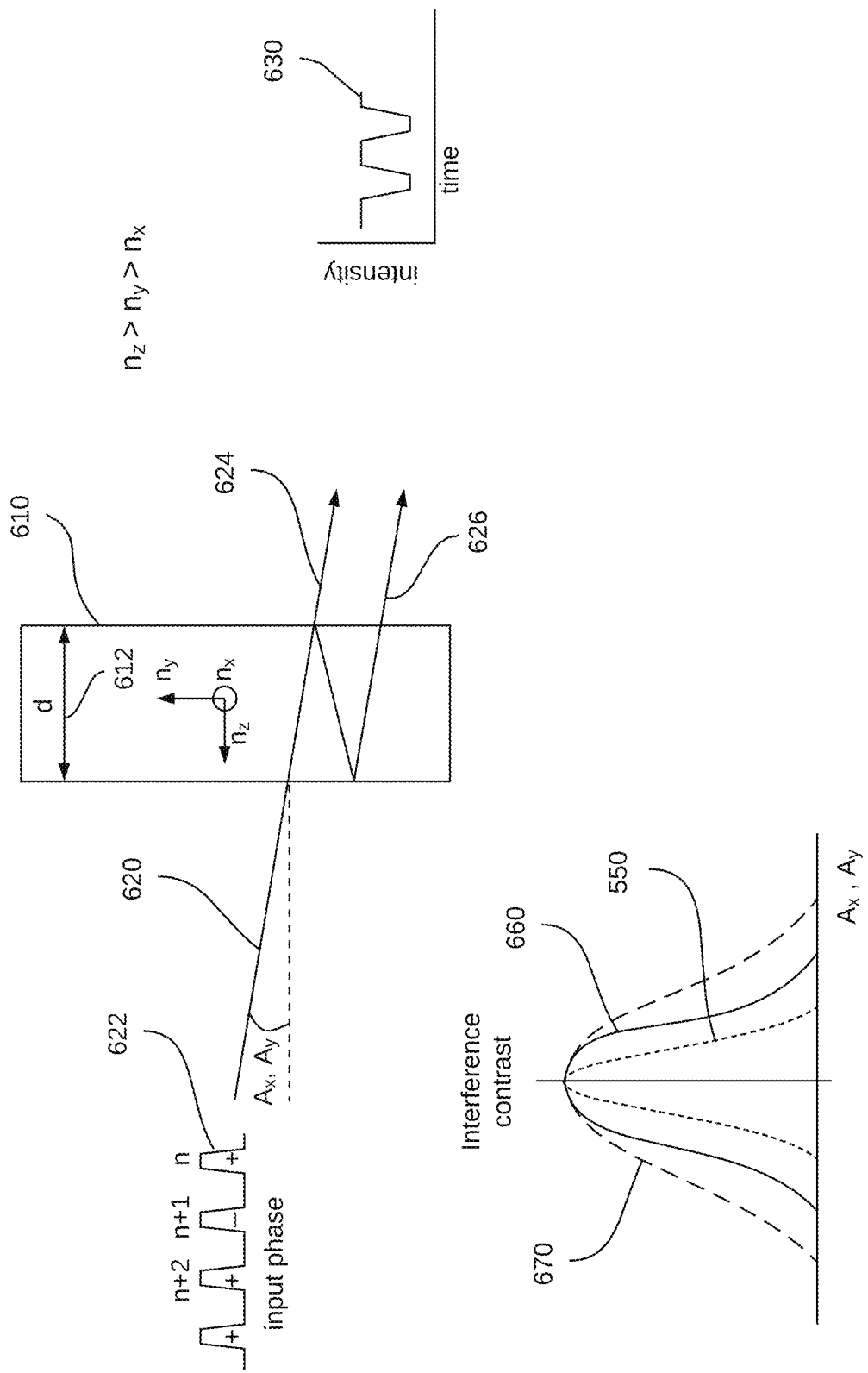
FIG. 6 shows still another alternative demodulator etalon for use with the optical receiver, in accordance with an embodiment.

Additional embodiments are illustrated in FIGS. 5 and 6, which rely on material properties of the demodulator etalon rather than thickness differences to provide improved performance over previous demodulator etalons. In particular, FIG. 5 shows a demodulator etalon 510 with a thickness d (indicated by a double-headed arrow 512). In accordance with an embodiment, demodulator etalon 510 is formed of a uniaxial material exhibiting directionally-dependent indices of refraction. For instance, in the embodiment shown in FIG. 5, demodulator etalon exhibits an index of refraction $n_x$ along an x-axis, an index of refraction $n_y = n_x$ along a y-axis, and an index of refraction $n_z$, which is not equal to $n_x$ nor $n_y$, along a z-axis, as shown in FIG. 5. Consequently, the index of refraction seen by an optical signal 520 is dependent on an incident angle A (i.e., index of refraction=n(A)). For instance, for $n_z > n_x = n_y$, optical signal 520 with input phase 522 can result in a demodulated output 530, which is essentially the same as the effect of the upper section of demodulator etalon 310 of FIG. 3. However, for other incident angles in the x- and y-directions, the angle dependence of the index of refraction results in an improved interference contrast performance over a wider range of incident angles than a demodulator etalon with an isotropic material. As an illustration, if the interference contrast performance of an isotropic demodulator etalon is represented by a curve 550, the interference contrast performance of demodulator etalon 510 is represented by a curve 560, showing improved interference contrast over a wider range of incident angles in the x- and y-directions.

The concept can be expanded to a demodulator etalon 610 formed of a biaxial material, such as shown in FIG. 6. For instance, if the directionally-dependent indices of refraction are such that $n_z > n_y > n_x$, then the angular dependence of the interference contrast can be represented by curves 660 and 670 in the x- and y-directions, respectively. Suitable biaxial materials include, for instance, liquid crystals, meta materials, calcite, and quartz.

Optionally, demodulation etalon 510 and 610 can be formed of a liquid crystal or another electro-optical material that is tunable by voltage application thereto. Such tunability is useful for, for example, to compensate for thickness changes in the demodulator etalon due to thermal expansion. The tuning of the material properties of the demodulator etalon can be combined with modulation of the pulse rate of the optical input phase for further compensation.

Figure 7:
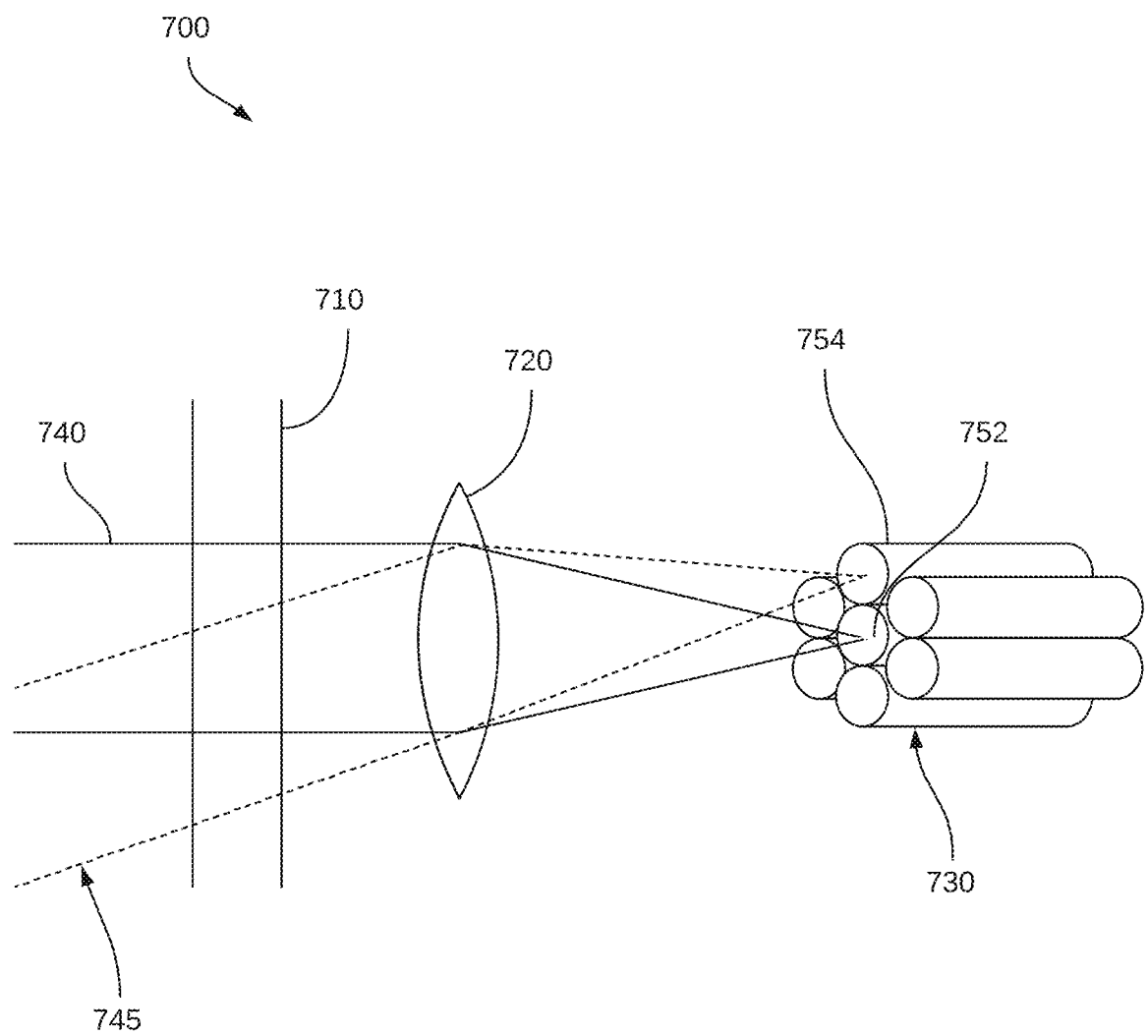
FIG. 7 shows an exemplary configuration of a demodulator etalon, in accordance with an embodiment.

An application of a demodulator etalon 710 with angular dependent performance is shown in FIG. 7. One or more optical components (represented by a lens 720) is used in conjunction with demodulator etalon to focus light exiting demodulator etalon 710 onto different portions of a fiber bundle 730. For example, a first light beam 740 (represented by solid lines) incident on demodulator etalon 710 is directed by lens 720 onto a first fiber 752. A second light beam 745 (represented by dashed lines), which is incident an off-axis angle onto demodulator etalon 710, is directed by lens 720 onto a second fiber 754. First and second light beams 740 and 745, respectively, can include different data sets such that the combination of demodulator etalon 710 and lens 720 result in different sets of data being delivered to different fibers within a fiber bundle. Thus, by combining a plurality of such combinations of optics, demodulator etalons, and fiber bundles, the field of view of the receiver system as a whole can be increased. Alternatively, optical signals from different, angularly separated transmitters can be simultaneously received at the receiver system.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention.

Accordingly, many different embodiments stem from the above description and the drawings. It will be understood that it would be unduly repetitious and obfuscating to literally describe and illustrate every combination and sub-combination of these embodiments. As such, the present specification, including the drawings, shall be construed to constitute a complete written description of all combinations and subcombinations of the embodiments described herein, and of the manner and process of making and using them, and shall support claims to any such combination or sub-combination.

In the specification, there have been disclosed embodiments of the invention and, although specific terms are employed, they are used in a generic and descriptive sense only and not for purposes of limitation. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be That which is claimed:

1. An optical receiver for use in free space communication from a transmitter to the optical receiver, the optical receiver being configured for receiving optical signals from the transmitter and comprising:
   optics for collecting the optical signals;
   a demodulator for converting the optical signals so collected into a data stream;
   a signal processing unit for processing the data stream into an analog signal; and
   an analog-to-digital converter for converting the analog signal into a digital output,
   wherein the demodulator includes a plurality of apertures, each one of the plurality of apertures being optically connected with an etalon of an optical path length that is different from the optical path length of another etalon optically connected with another one of the plurality of apertures,
   wherein at least one of the etalons is formed of a uniaxial material, and
   wherein the demodulator accepts input signal over a larger range of incident angles than would be accepted by another demodulator in which all of the etalons are formed of isotropic materials.

2. An optical receiver for use in free space communication from a transmitter to the optical receiver the optical receiver being configured for receiving optical signals from the transmitter and comprising:
   optics for collecting the optical signals;
   a demodulator for converting the optical signals so collected into a data stream;
   a signal processing unit for processing the data stream into an analog signal; and
   an analog-to-digital converter for converting the analog signal into a digital output,
   wherein the demodulator includes a plurality of apertures, each one of the plurality of apertures being optically connected with an etalon of an optical path length that is different from the optical path length of another etalon optically connected with another one of the plurality of apertures, and,
   wherein the demodulator at least one of the etalons is formed of a biaxial material.

3. The optical receiver of claim 2, wherein the demodulator accepts input signal over a larger range or incident angles than would be accepted by another modulator in which all of the etalons are formed of isotropic materials.

4. An optical receiver for use in free space communication from a transmitter to the optical receiver the optical receiver being configured for receiving optical signals from the transmitter and comprising:
   optics for collecting the optical signals;
   a demodulator for converting the optical signals so collected into a data stream;
   a signal processing unit for processing the data stream into an analog signal; and
   an analog-to-digital converter for converting the analog signal into a digital output,
   wherein the demodulator includes a plurality of apertures, each one of the plurality of apertures being optically connected with an etalon of an optical path length that is different from the optical path length of another etalon optically connected with another one of the plurality of apertures, and
   wherein the optics are configured for accepting optical signals from a plurality of transmitters over a range of incidence angles, the optical receiver further comprising a fiber bundle including a plurality of optical fibers, and wherein the combination of optics and demodulator is configured for directing each one of the optical signals accepted at the optics to a specific optical fiber depending on the incidence angle of that optical signal.

5. The optical receiver of claim 4, wherein the demodulator includes at least three apertures.

6. The optical receiver of claim 4, wherein at least one of the etalons is formed of a uniaxial material.

7. The optical receiver of claim 4, wherein at least one of the etalons is formed of a biaxial material.

8. The optical receiver of claim 4, wherein the optics and the demodulator are configured for simultaneously receiving optical signals from the plurality of transmitters.

9. An optical receiver for use in free space communication from a transmitter to the optical receiver, the optical receiver being configured for receiving optical signals from the transmitter and comprising:
   optics for collecting the optical signals;
   a demodulator for converting the optical signals so collected into a data stream;
   a signal processing unit for processing the data stream into an analog signal; and
   an analog-to-digital converter for converting the analog signal into a digital output,
   wherein the demodulator includes a plurality of apertures, each one of the plurality of apertures being optically connected with an etalon of an optical path length that is different from the optical path length of another etalon optically connected with another one of the plurality of apertures,
   wherein the optics are configured for accepting optical signals from a plurality of transmitters over a range of incidence angles, the optical receiver further comprising a fiber bundle including a plurality of optical fibers, and wherein the combination of optics and demodulator is configured for directing all of the optical signals accepted at the optics to a specific optical fiber to be combined at that specific optical fiber.

10. A receiver system for use in free space communication from a plurality of transmitters to the receiver system, the receiver system being configured for receiving optical signals from the plurality of transmitters and comprising:
    a plurality of optical receivers, each optical receiver including:
    optics for collecting at least a portion of the optical signals over a range of incident angles,
    a demodulator for converting the optical signals so collected into a data stream,
    a signal processing unit for processing the data stream into an analog signal,
    an analog-to-digital converter for converting the analog signal into a digital output,
    and a fiber bundle including a plurality of optical fibers,
    wherein the demodulator includes a plurality of apertures, each one of the plurality of apertures being optically connected with an etalon of an optical path length that is different from the optical path length of another etalon optically connected with another one of the plurality of apertures, wherein the combination of optics and demodulator is configured for directing each one of the optical signals accepted at the optics to a specific optical fiber depending on the incident angle of that optical signal, and wherein each one of the plurality of optical receivers is configured for receiving a different portion of the optical signals from the portion received by every other one of the plurality of optical receivers.

11. A receiver system for use in free space communication from a plurality of transmitters to the receiver system, the receiver system being configured for receiving optical signals from the plurality of transmitters and comprising:

a plurality of optical receivers, each optical receiver including:

optics for collecting at least a portion of the optical signals over a range of incident angles, a demodulator for converting the optical signals so collected into a data stream, a signal processing unit for processing the data stream into an analog signal, an analog-to-digital converter for converting the analog signal into a digital output, and a fiber bundle including a plurality of optical fibers, wherein the demodulator includes a plurality of apertures, each one of the plurality of apertures being optically connected with an etalon of an optical path length that is different from the optical path length of another etalon optically connected with another one of the plurality of apertures, wherein the combination of optics and demodulator is configured for directing all of the optical signals accepted at the optics to a specific optical fiber to be combined at that specific optical fiber, and wherein each one of the plurality of optical receivers is configured for receiving a different portion of the optical signals from the portion received by every other one of the plurality of optical receivers.

* * * * *